United States Patent
Oda et al.

(10) Patent No.: US 8,406,367 B2
(45) Date of Patent: *Mar. 26, 2013

(54) INFORMATION PROCESSING APPARATUS AND DATA COMMUNICATION METHOD

(75) Inventors: Hiroyuki Oda, Hyogo (JP); Yojiro Kamise, Hyogo (JP); Hisakazu Yanagiuchi, Hyogo (JP); Yakayuki Ohnishi, Hyogo (JP); Yuji Morimiya, Chiba (JP); Kazuyoshi Takemura, Tokyo (JP); Kenji Nakada, Kanagawa (JP)

(73) Assignee: Sony Corporation, Tokyo (JP)

( * ) Notice: Subject to any disclaimer, the term of this patent is extended or adjusted under 35 U.S.C. 154(b) by 86 days.

This patent is subject to a terminal disclaimer.

(21) Appl. No.: 12/453,151

(22) Filed: Apr. 30, 2009

(65) Prior Publication Data

US 2009/0276357 A1 Nov. 5, 2009

Related U.S. Application Data

(63) Continuation of application No. 11/898,240, filed on Sep. 11, 2007, now Pat. No. 7,551,704, which is a continuation of application No. 11/312,710, filed on Dec. 21, 2005, now Pat. No. 7,333,583, which is a continuation of application No. 10/024,179, filed on Dec. 21, 2001, now Pat. No. 7,050,526.

(30) Foreign Application Priority Data

Dec. 25, 2000 (JP) ................................. 2000-396912

(51) Int. Cl.
*H04L 23/00* (2006.01)

(52) U.S. Cl. ...................... 375/377; 340/5.41; 340/5.65

(58) Field of Classification Search .................. 375/377; 340/5.52, 5.65, 10.1, 5.41; 235/375, 380, 235/451, 439

See application file for complete search history.

(56) References Cited

U.S. PATENT DOCUMENTS

| | | | |
|---|---|---|---|
| 5,382,781 A * | 1/1995 | Inoue | 235/384 |
| 5,578,808 A | 11/1996 | Taylor | |
| 5,589,855 A | 12/1996 | Blumstein et al. | |
| 5,841,051 A * | 11/1998 | Segan | 84/477 R |
| 5,845,147 A | 12/1998 | Vishlitzky et al. | |
| 5,945,652 A | 8/1999 | Ohki et al. | |
| 6,038,613 A | 3/2000 | Garcia et al. | |
| 6,072,795 A | 6/2000 | Poulter | |
| 6,073,236 A * | 6/2000 | Kusakabe et al. | 713/169 |
| 6,073,856 A | 6/2000 | Takahashi | |
| 6,078,266 A | 6/2000 | Yang | |
| 6,157,559 A | 12/2000 | Yoo | |
| 6,230,971 B1 | 5/2001 | Matsumoto et al. | |
| 6,237,849 B1 | 5/2001 | Cooper et al. | |
| 6,247,644 B1 | 6/2001 | Horne et al. | |
| 6,298,245 B1 | 10/2001 | Usui et al. | |
| 6,345,043 B1 | 2/2002 | Hsu | |
| 6,465,880 B1 | 10/2002 | Dobashi et al. | |
| 6,480,869 B1 | 11/2002 | Fujioka | |
| 6,484,947 B1 * | 11/2002 | Miyata | 235/492 |

(Continued)

FOREIGN PATENT DOCUMENTS

EP 0 793 187 A2 9/1997
EP 0 872 816 A2 1/1998

(Continued)

*Primary Examiner* — Jean B Corrielus
(74) *Attorney, Agent, or Firm* — Rader, Fishman & Grauer PLLC

(57) ABSTRACT

An information apparatus switches a display at a predetermined area which includes at least a part of a portion where an electromagnetic-wave emitting unit used for data communications with a data storage device is disposed, according to data communication processing with the data storage device, and emits sound generated according to the processing at corresponding timing.

20 Claims, 10 Drawing Sheets

U.S. PATENT DOCUMENTS

| | | |
|---|---|---|
| 6,519,266 B1 | 2/2003 | Manning et al. |
| 6,549,715 B1 | 4/2003 | Sasaki |
| 6,587,698 B1 | 7/2003 | Dosch |
| 6,593,167 B2 | 7/2003 | Dobashi et al. |
| 6,611,208 B1 | 8/2003 | Ketler |
| 6,631,442 B1 | 10/2003 | Blumenau |
| 6,747,564 B1 | 6/2004 | Mimura et al. |
| 6,786,407 B1 * | 9/2004 | Takasugi ............... 235/451 |
| 6,944,621 B1 | 9/2005 | Collart |
| 7,050,526 B2 | 5/2006 | Oda et al. |
| 7,086,087 B1 * | 8/2006 | Kaminaga et al. ......... 726/16 |
| 7,330,949 B2 * | 2/2008 | Takaragi et al. ......... 711/164 |
| 2002/0023956 A1 | 2/2002 | Kaneko |
| 2002/0190364 A1 | 12/2002 | Dobashi et al. |
| 2003/0137404 A1 | 7/2003 | Bonneau et al. |
| 2004/0258245 A1 * | 12/2004 | Kusakabe et al. ............ 380/277 |

FOREIGN PATENT DOCUMENTS

| | | |
|---|---|---|
| EP | 0 899 683 A2 | 3/1999 |
| EP | 0 793 187 A3 | 2/2000 |
| JP | 410232908 A * | 9/1998 |
| JP | 11-154204 A | 6/1999 |
| JP | 2000-172793 A | 6/2000 |
| JP | 02000251031 A * | 9/2000 |

* cited by examiner

FIG. 12A
FIG. 12B
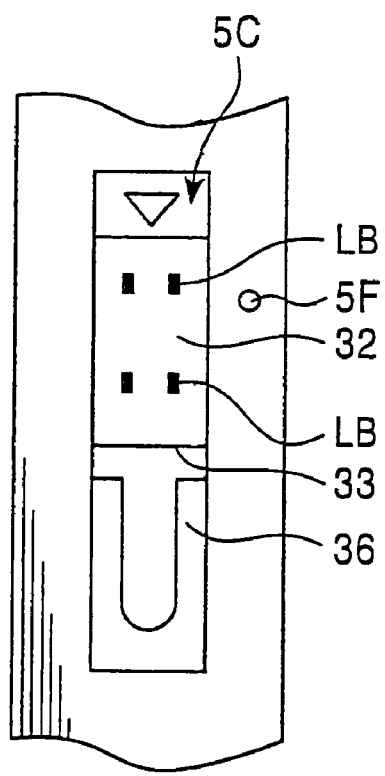
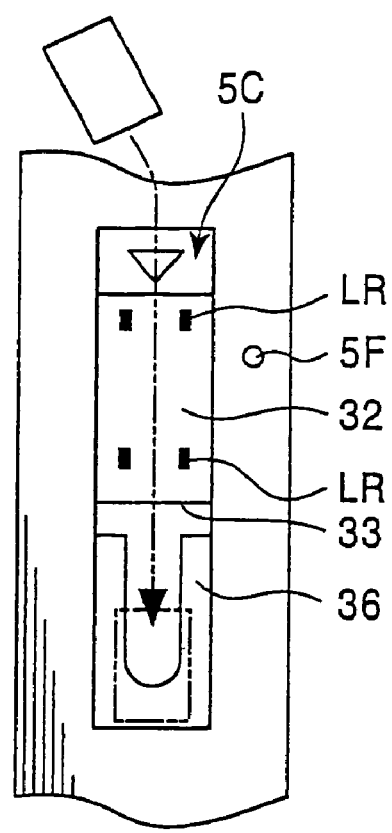

FIG. 13A
FIG. 13B
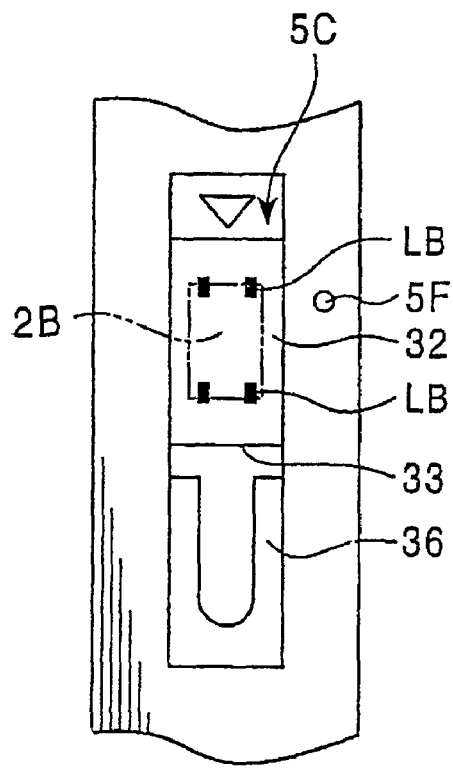
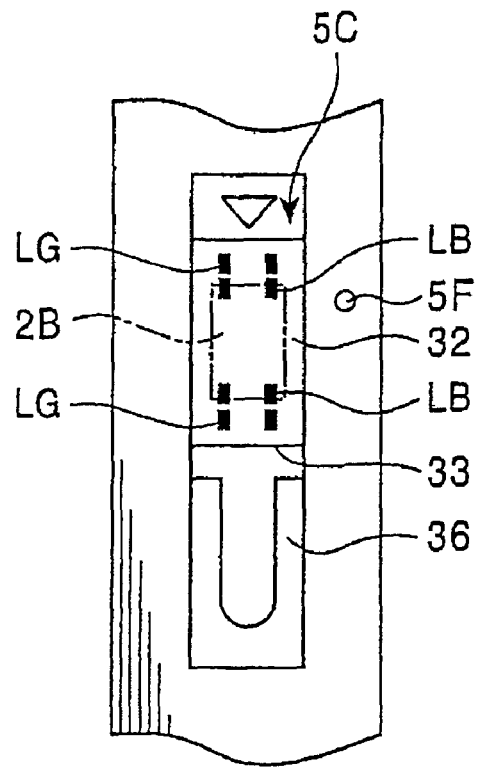

INFORMATION PROCESSING APPARATUS AND DATA COMMUNICATION METHOD

CROSS REFERENCE TO RELATED APPLICATIONS

The present application is a Continuation Application of the patent application Ser. No. 11/898,240, filed Sep. 11, 2007, now U.S. Pat. No. 7,551,704, which is a Continuation Application of the patent application Ser. No. 11/312,710, filed Dec. 21, 2005, now U.S. Pat. No. 7,333,583, which is a Continuation Application of Parent application Ser. No. 10/024,179; filed Dec. 21, 2001, now U.S. Pat. No. 7,050,526, which claims priority from Japanese Application No. 2000-396912, filed on Dec. 25, 2000, the entire contents of which are incorporated herein by reference.

BACKGROUND OF THE INVENTION

1. Field of the Invention

The present invention relates to information processing apparatuses and data communication methods, and can be applied, for example, to processing for non-contact-type IC cards.

2. Description of the Related Art

Since non-contact-type IC cards can record various types of data and can be accessed in a non-contact manner, they are conventionally used, for example, as electronic-money recording media and for enter/leave management of a room.

In this type of IC card, a high-frequency signal induced in a built-in loop antenna is rectified to generate a driving power source. Therefore, when an IC card is held in a vicinity of a reader/writer, which accesses this type of IC cards, a high-frequency signal sent from the reader/writer is induced in the loop antenna and the IC card starts operating.

When the IC card starts operating in this way, signal processing is applied to the high-frequency signal induced in the loop antenna to analyze a command sent from the reader/writer, and in addition, various types of data sent from the reader/writer is received. The IC card also switches, for example, the terminal impedance of the loop antenna at a predetermined timing according to an analysis result of the command to send a status, data recorded into a memory, and others to the reader/writer.

A system using this type of IC card executes mutual authentication with an IC card to transmit and receive data. Data to be transmitted and received is encrypted and then transmitted and received to assure higher safety.

Since this type of non-contact-type IC card can be accessed just by holding them in a vicinity of a reader/writer, electronic-money processing and the like can be executed without passing them to a clerk, unlike conventional credit cards, and also thereby safety is assured.

Although non-contact IC cards are convenient in this way, they need to be held in a vicinity of a reader/writer while the reader/writer accesses them and executes electronic-money processing or other operations. During this period, if the user moves the IC card away from the reader/writer, it is necessary to repeat the processing.

Therefore, to prevent such processing repetition and to improve ease-of-use, the user may be prompted to place an IC card at a predetermined position.

Even in such usage, when a user interface which effectively uses a feature of non-contact-type IC cards, that is, accessibility obtained when the IC cards are held in a vicinity of a reader/writer, is provided, this type of IC card can be applied to various increasing fields, and in addition, the user can use them more easily.

SUMMARY OF THE INVENTION

The present invention has been made in consideration of the above points. An object of the present invention is to provide an information processing apparatus and a data communication method which allow a user interface effectively using a feature of data storage devices, that is, non-contact accessibility, to be provided.

The foregoing object is achieved in one aspect of the present invention through the provision of an information processing apparatus for accessing a predetermined data storage device in a non-contact manner, including electromagnetic-wave emitting means disposed at a predetermined position for emitting an electromagnetic wave; data communication means for transmitting and receiving data to and from the data storage device through the electromagnetic-wave emitting means; a display having a display area to which a predetermined area which includes at least a part of a portion where the electromagnetic-wave emitting means is disposed is set; and control means for controlling the operations of the data communication means and the display, wherein the control means switches a presentation of the display according to processing of the data communication means.

According to the above structure, since a presentation of the display having a predetermined display area is switched according to processing performed by the data communication means for transmitting and receiving data with the data storage device held in a vicinity of the display area, it is possible, for example, that the display guides the user to convey the data storage device to the display area, and in addition, a result of processing is displayed at a portion where the medium has been conveyed. Therefore, a user interface effectively using a feature of data storage devices, that is, non-contact accessibility, can be provided.

The foregoing object is achieved in another aspect of the present invention through the provision of a data communication method for accessing a predetermined data storage device in a non-contact manner, including the step of switching a presentation of a predetermined area which includes at least a part of a portion where electromagnetic-wave emitting means used for data communication with the data storage device is disposed, according to data communication processing with the data storage device.

According to the above structure, a data communication method employing a user interface effectively using a feature of data storage devices, that is, non-contact accessibility, can be provided.

The foregoing object is achieved in still another aspect of the present invention through the provision of a data communication method for accessing a predetermined data storage device in a non-contact manner, including the step of emitting sound generated according to data communication processing with the data storage device, at timing corresponding to the data communication processing.

According to the above structure, when sound generated according to data communication processing with the data storage device is emitted at timing corresponding to the data communication processing, even if a series of processing is finished by operations performed by the user for a data storage device such as an IC card, the user can understand a progress state of the processing.

The foregoing object is achieved in yet another aspect of the present invention through the provision of an information processing apparatus for performing data communication with a data storage device, including communication means for transmitting and receiving data to and from the data storage device by an electromagnetic wave; and state indication means for indicating a first state in which the information processing apparatus is waiting for communication with the data storage device, a second state in which the information processing apparatus is communicating with the data storage device, and a third state in which communication between the information processing apparatus and the data storage device has been finished.

The foregoing object is achieved in still yet another aspect of the present invention through the provision of a guidance method on communication between a data holding apparatus and a processing apparatus for transmitting and receiving data in a non-contact manner, including the step of guiding on the state of communication with the data holding apparatus by the use of sound or light.

As described above, according to the present invention, a presentation at a predetermined area which includes at least a part of a portion where electromagnetic-wave emitting means used for data communication with a data storage device is disposed is switched according to data communication processing with the data storage device to provide a user interface effectively using a feature of the data storage device, non-contact accessibility.

BRIEF DESCRIPTION OF THE DRAWINGS

FIG. 12A and FIG. 12B are plans of the deposit machine shown in FIG. 10, in which an error occurs.

FIG. 13A and FIG. 13B are plans of the deposit machine shown in FIG. 10, in which processing has been performed correctly.

DESCRIPTION OF THE PREFERRED EMBODIMENTS

Figure 1:
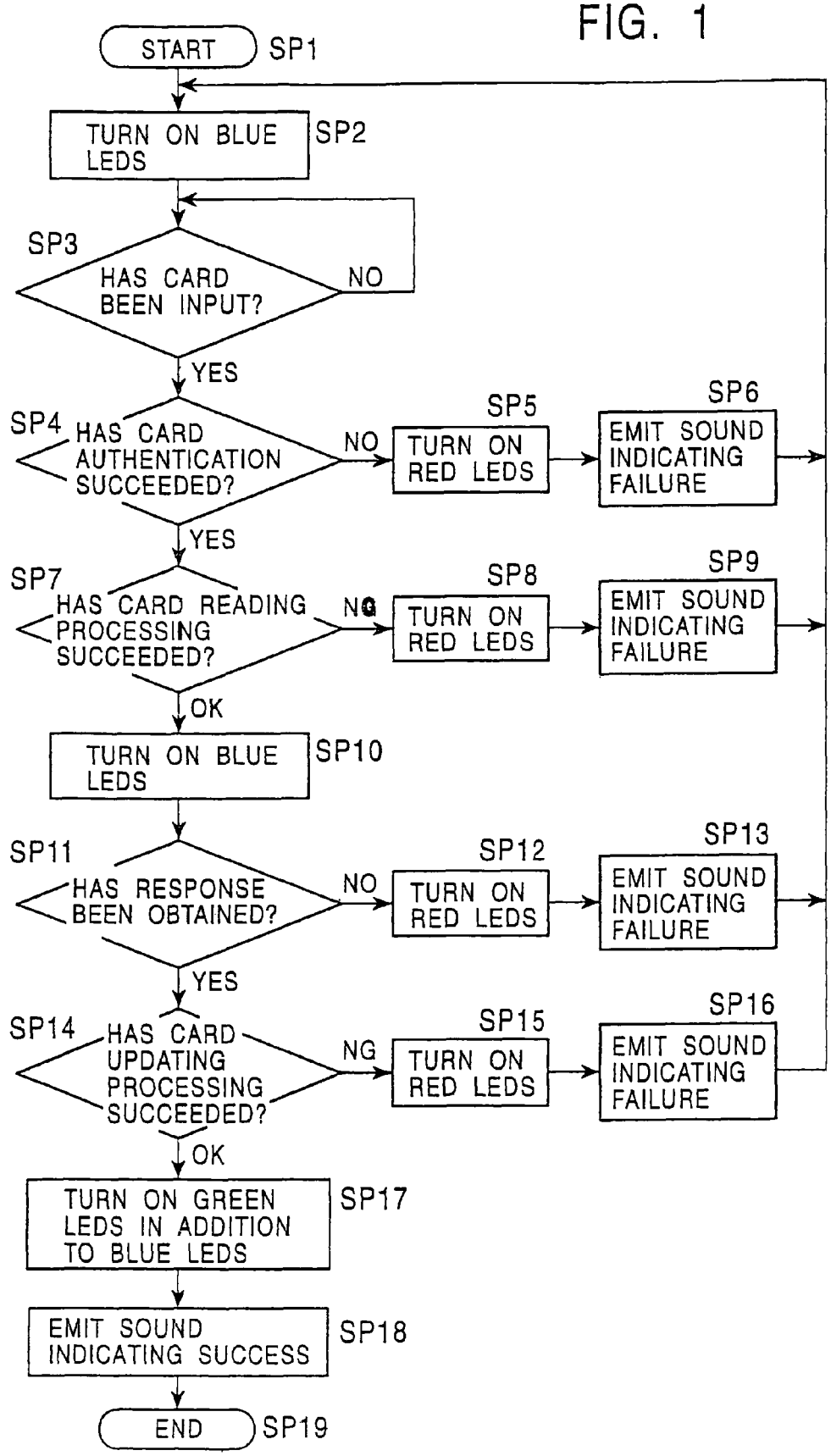
FIG. 1 is a flowchart showing the processing procedure of a central processing unit in an input and output section according to an embodiment of the present invention.

Embodiments of the present invention will be described below in detail by referring to the drawings, if necessary.

(1) First Embodiment (1-1) Structure of the First Embodiment

Figure 2:
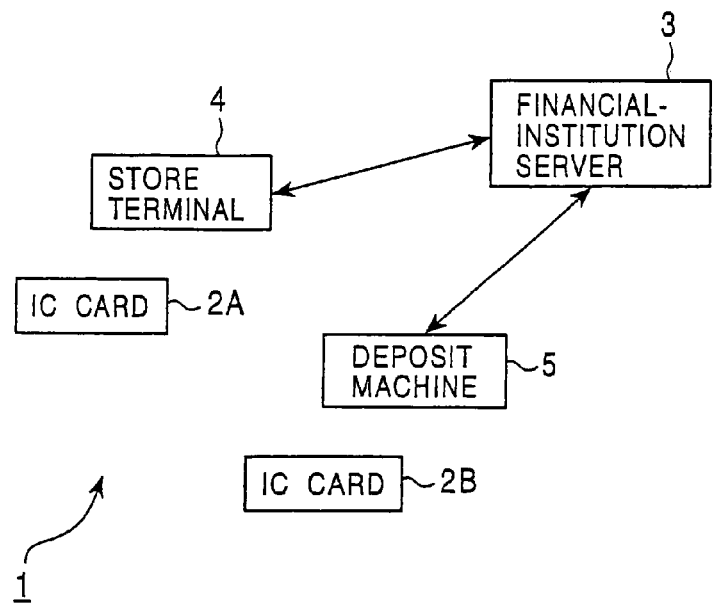
FIG. 2 is a block diagram showing an IC card system according to an embodiment of the present invention.

FIG. 2 is a block diagram showing an IC-card system according to a first embodiment of the present invention. In this IC-card system 1, non-contact-type IC cards 2A and 2B are used as electronic-money recording media.

In this IC-card system 1, a financial-institution server 3 records electronic money and executes processing such as settlement. More specifically, the financial-institution server 3 updates recording of electronic money in the IC card 2A and a store terminal 4 when the store terminal 4 accesses the financial-institution server 3. The financial-institution server 3 also records the deposit of electronic money in the IC card 2B when a deposit machine 5 accesses the financial-institution server 3. The financial-institution server 3 executes the same processing as described above when a financial-institution terminal or a terminal apparatus, such as a personal computer individually owned by the user, accesses the financial-institution server 3.

The store terminal 4 is a terminal apparatus disposed at one of various stores, and takes electronic money equivalent to payment out of electronic money recorded in the IC card 2A, and reports such electronic-money transfer to the financial-institution server 3. In contrast, the deposit machine 5 is a terminal apparatus disposed at a predetermined financial institution or the like, and receives a deposit by cash and increases electronic money recorded in the IC card 2B. The deposit machine 5 also reports the electronic-money increase to the financial-institution server 3.

With these operations, various payment processes can be executed using electronic money recorded in an IC card, and electronic money reduced by such a payment process can be increased by the deposit machine 5 or the like, in the IC-card system 1.

Figure 3:
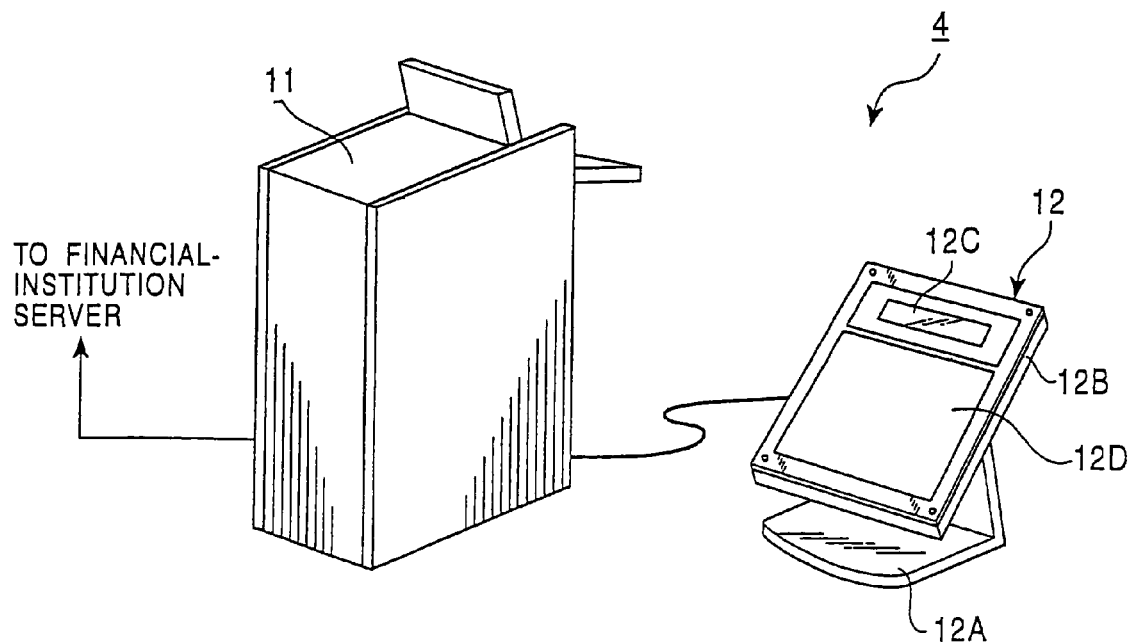
FIG. 3 is a perspective view showing a store terminal of the IC card system shown in FIG. 2.

FIG. 3 is a perspective view of the store terminal 4. The store terminal 4 is formed of a body apparatus 11 and an input and output section 12. The body apparatus 11 is an accounting apparatus which functions as a point-of-sale (POS) apparatus, and executes payment calculation processing and others. The body apparatus 11 also instructs the input and output section 12 to perform payment processing according to calculated payment, obtains a result of processing, and reports it to the financial-institution server 3.

The input and output section 12 is a reader/writer for the IC card 2A, prompts the user to perform an IC-card operation according to an instruction from the body apparatus 11, reduces electronic money recorded in the IC card, and reports a result of processing to the body apparatus 11. The input and output section 12 is formed by placing a plate-shaped body section 12B on a predetermined-shaped stand 12A. In the body section 12B, a display section 12C formed of a liquid-crystal display panel is formed at an upper section of the front surface, and a placement section 12D is formed under the display section 12C.

A printed circuit board on which various processing circuits required for processing with an IC card, various processing circuits required for processing with the body apparatus 11, and others are mounted is accommodated in a thin case; and a semi-transparent decorative panel having a predetermined opening and a plane, transparent acrylic plate are sequentially laminated and disposed on an opening of the case so as to cover the entire front surface of the case to form the body section 12B.

The display section 12C is formed such that a presentation on the liquid-crystal display panel mounted on the printed circuit board in this way can be seen from the front-surface side. In contrast, in the placement section 12D, a loop antenna serving as electromagnetic-wave emitting means used for data communication with an IC card is disposed at a predetermined position on the printed circuit board, corresponding to almost the center of the placement section 12D. Therefore, the input and output section 12 can exchange data with an IC card when the IC card is held in a vicinity of a predetermined area centering around the center of the placement section 12D.

Various light-emitting diodes are disposed on the printed circuit board so as to enclose the loop antenna, and a semi-transparent decorative panel and a plane, transparent acrylic plate are sequentially laminated and formed above the light-emitting diodes to form the placement section 12D serving as a display section having a predetermined display area.

In the input and output section 12, this acrylic plate has a plane surface at the front-surface side, and the entire front surface, including the placement section 12D, is formed of a plane surface without having a dented section for guiding a position where an IC card is placed. Therefore, the input and output section 12 has a simplified structure and a good design with a feature of non-contact-type IC cards, that is, accessibility just by holding them in a vicinity of a reader/writer, being effectively used.

Even when various indications are performed by the lighting of light-emitting diodes in the placement section 12D and the placement section 12D has a plane surface in this way, the user is guided to perform an IC-card operation without an error, and in addition, an error generated when a different card is placed can be reported to the user.

Figure 4:
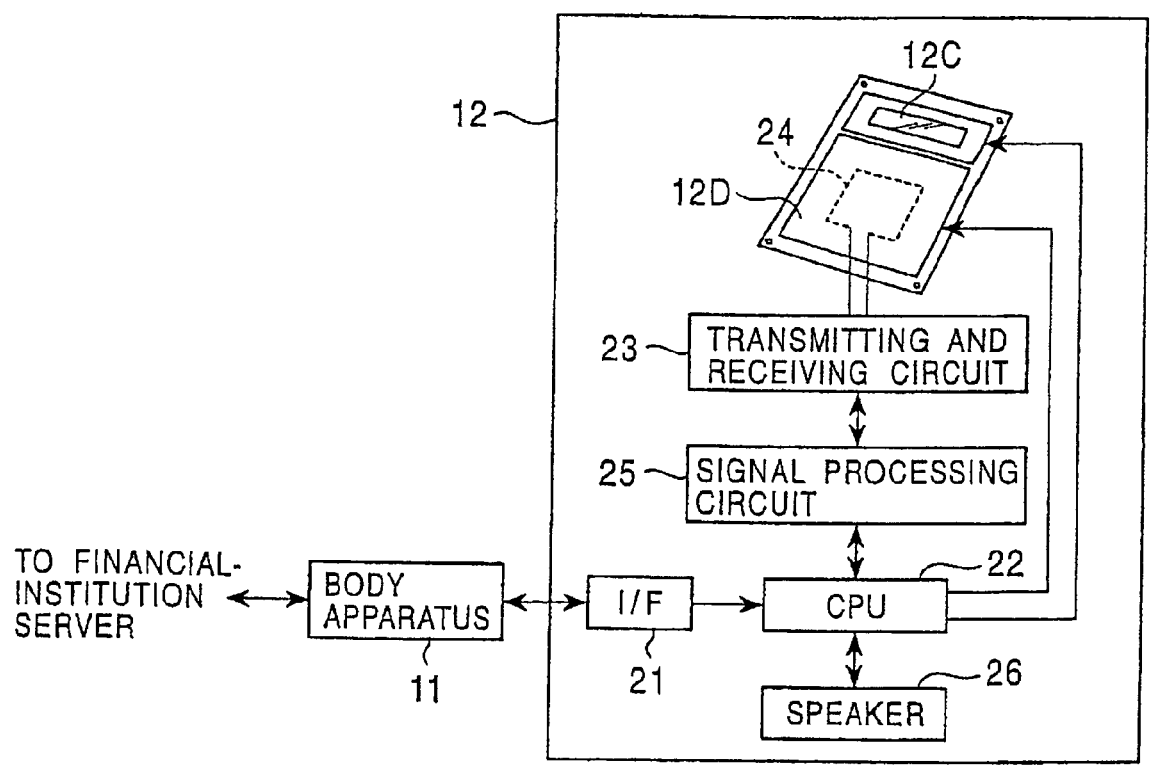
FIG. 4 is a block diagram of the input and output section of the store terminal shown in FIG. 3.

FIG. 4 is a block diagram showing the structure of the input and output section 12. In the input and output section 12, an interface (I/F) 21 serves as an input and output circuit with the body apparatus 11, reports various commands and data output from the body apparatus 11 to a central processing unit (CPU) 22, and outputs statuses corresponding to the commands, and data read from an IC card, both of which are output from the central processing unit 22 to the body apparatus 11 under the control of the central processing unit 22.

A transmitting and receiving circuit 23 drives the loop antenna 24 disposed almost at the center of the placement section 12D by a predetermined high-frequency signal under the control of the central processing unit 22, and when the IC card 2A is held in a vicinity, turns on the power of the IC card 2A by the high-frequency signal. The transmitting and receiving circuit 23 also modulates the high-frequency signal by a data string output from a signal processing circuit 25 to transmit various commands and data used for recording to the IC card 2A. The transmitting and receiving circuit 23 stops modulating such a high-frequency signal at a predetermined timing, detects a high-frequency signal at the loop antenna 24 to obtain various data sent from the IC card 2A, and outputs the data to the signal processing circuit 25.

The signal processing circuit 25 applies encryption processing and encoding processing to data output from the central processing unit 22 under the control of the central processing unit 22, and outputs data obtained as a result of the processing to the transmitting and receiving circuit 23 by a serial data string. In a reverse way, the signal processing circuit 25 also applies decryption processing to decrypt a data string obtained from the transmitting and receiving circuit 23 to release encryption, and outputs data obtained as a result to the central processing unit 22.

The central processing unit 22 is a controller for controlling the operation of the input and output section 12, specifies a work area in a memory (not shown), and executes electronic-money processing specified by the body apparatus 11 according to a predetermined processing procedure. In this processing, the central processing unit 22 follows a processing procedure shown in FIG. 1 to switch the presentation of the placement section 12D according to the processing. Thereby, the user positively places an IC card and the processing can be finished.

More specifically, when the body apparatus 11 instructs the start of the electronic-money processing, the central processing unit 22 activates the operation of the transmitting and receiving circuit 23, and controls the operation of the signal processing circuit 25 so as to send a polling command to the IC card 2A. When sending a polling command is started, the procedure proceeds from step SP1 to step SP2, and the central processing unit 22 instructs blue light-emitting diodes disposed in the placement section 12D to blink.

Figure 5:
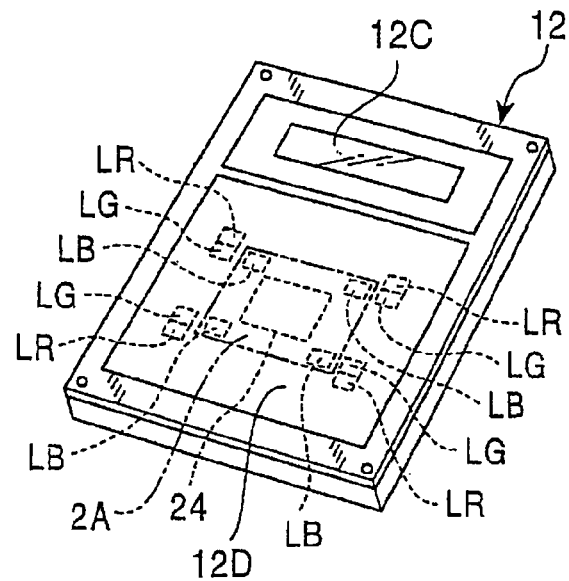
FIG. 5 is a perspective view showing the structure of the input and output section shown in FIG. 4.

As shown in FIG. 5, blue light-emitting diodes LB are disposed at portions corresponding to the four corners of the IC card 2A, the four corners being determined when the IC card 2A is placed at the center of the placement section 12D, and a location where the IC card 2A is to be placed can be indicated by lighting of the blue light-emitting diodes LB. Green light-emitting diodes LG are disposed outside the blue light-emitting diodes LB at the right and left by a predetermine distance apart, corresponding to the blue light-emitting diodes LB. The input and output section 12 can report to the user that a series of processing has been successfully finished by lighting of the green light-emitting diodes LG. Red light-emitting diodes LR are disposed outside above and below the green light-emitting diodes LG in their vicinities, corresponding to the green light-emitting diodes LG. The input and output section 12 can report to the user that a series of processing cannot be successfully finished by lighting of the red light-emitting diodes LR.

These light-emitting diodes LB, LR, and LG are mounted on the printed circuit board and accommodated in the case, and the semi-transparent decorative panel and the transparent plate are sequentially disposed thereon to form the placement section 12D such that it also functions as a display section. Lighting of these light-emitting diodes LB, LR, and LG can be seen at a large area. Even if the user does not pay special attention to lighting of diodes, the user can easily recognize the placement position of an IC card even vaguely, and in addition, the user can check an error and the completion of the processing.

Figure 6:
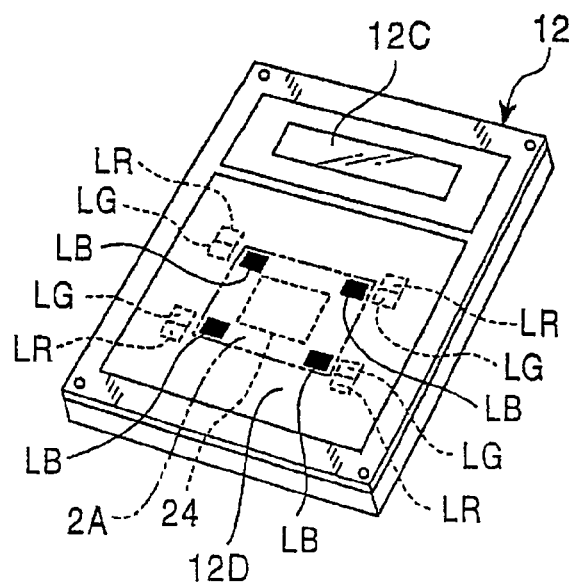
FIG. 6 is a perspective view of the input and output section shown in FIG. 5, in which the placement of an IC card is awaited.

In the process of step SP2, the central processing unit 22 blinks the blue light-emitting diodes LB disposed at the portions corresponding to the four corners of the IC card 2A as shown in FIG. 6. To a user who cannot understand the meaning of lighting of the blue light-emitting diodes LB even when an attention is called by lighting of the blue light-emitting diodes LB, a message "Place card over" is indicated at the display section 12C to prompt an operation of the IC card 2A. A payment is also reported to the user by a message "Payment: $xxx" indicated at the display section 12C.

Then, the procedure proceeds to step SP3, and the central processing unit 22 determines from a result of the processing performed by the signal processing circuit 25 whether a response corresponding to the polling command has been obtained from the IC card 2A. When a negative result is obtained here, the central processing unit 22 repeats step SP3 to wait for a response corresponding to the polling command to come. In contrast, when an affirmative result is obtained in step SP3, the central processing unit 22 controls the operation of the signal processing circuit 25 such that mutual authentication processing is executed with the communication object which has sent back the response.

Figure 7:
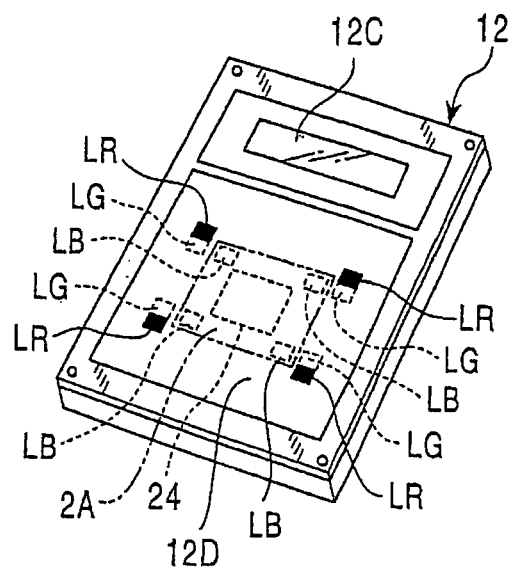
FIG. 7 is a perspective view of the input and output section shown in FIG. 5, in which an error is reported.

Then, the procedure proceeds to step SP4, and the central processing unit 22 determines from data output from the signal processing circuit 25 whether mutual authentication has been successfully performed with the communication object. When a negative result is obtained, the procedure proceeds to step SP5, and the central processing unit 22 instructs that blinking of the blue light-emitting diodes LB is stopped and the red light-emitting diodes LR are turned on for a predetermined time to indicate an error to the user, as shown in FIG. 7. A message "Wrong card" is displayed at the display section 12C to report the content of the error to the user.

Then, the procedure proceeds to step SP6, and the central processing unit 22 drives a speaker 26 (FIG. 4) which functions as sound emitting means to emit a predetermined alarm sound. Then, the procedure returns to step SP2. The central processing unit 22 again blinks the blue light-emitting diodes LB, and displays a predetermined message to prompt the user to place an IC card.

In contrast, when an affirmative response is obtained in step SP4, the procedure proceeds to step SP7. The central processing unit 22 instructs the signal processing circuit 25 to read individual information, the amount of electronic money, and others recorded in the IC card 2A, and determines from data sent from the signal processing circuit in response to the instruction whether the information has been read correctly. When the information cannot be read correctly due to an error of the IC card or other reasons, a negative result is obtained, and the procedure proceeds to step SP8.

In the same way as in step SP5, the central processing unit 22 instructs that blinking of the blue light-emitting diodes LB is stopped and the red light-emitting diodes LR are turned on for a predetermined time to indicate an error to the user. A message having a content corresponding to data output from the signal processing circuit 25 is displayed at the display section 12C to report the content of the error to the user.

Then, the procedure proceeds to step SP9, and the central processing unit 22 drives the speaker 26 to emit the same alarm sound as in step SP6. Then, the procedure returns to step SP2. The central processing unit 22 again blinks the blue light-emitting diodes LB, and displays a predetermined message to prompt the user to place an IC card.

In contrast, when an affirmative result is obtained in step SP7, the procedure proceeds to step SP10. The central processing unit 22 changes blinking of the blue light-emitting diodes LB to continuous lighting. Then, the processing proceeds to step SP11, and the central processing unit 22 controls the operation of the signal processing circuit 25 to instruct the IC card 2A to update electronic money. The central processing unit 22 calculates the amount of money to be written by subtracting the amount of payment from the amount of electronic money recorded in the IC card 2A, and instructs that the amount of electronic money is updated to that to be written. In addition, the central processing unit 22 determines from data output from the signal processing circuit 25 whether a response corresponding to this updating instruction has been obtained from the IC card 2A.

When a negative result is obtained, which means that the IC card 2A, the processing object, is moved away from the loop antenna 24 before the processing is finished, or the like, the procedure proceeds to step SP12 and the central processing unit 22 instructs that blinking of the blue light-emitting diodes LB is stopped and the red light-emitting diodes LR are turned on for a predetermined time to indicate an error to the user. A predetermined error message is displayed at the display section 12C to report the content of the error to the user.

Then, the procedure proceeds to step SP13, and the central processing unit 22 drives the speaker 26 to emit the same alarm sound as in step SP6. Then, the procedure returns to step SP2. The central processing unit 22 again blinks the blue light-emitting diodes LB, and displays a predetermined message to prompt the user to place an IC card.

In contrast, when an affirmative result is obtained in step SP11, the procedure proceeds to step SP14. The central processing unit 22 determines from data output from the signal processing circuit 25 whether a status telling that the amount of electronic money has been correctly updated has been obtained from the IC card 2A. When a negative result is obtained, which also means that the IC card 2A, the processing object, is moved away from the loop antenna 24 before the processing is finished, or the like, the procedure proceeds to step SP15 and the central processing unit 22 instructs that blinking of the blue light-emitting diodes LB is stopped and the red light-emitting diodes LR are turned on for a predetermined time to indicate an error to the user. A predetermined error message is displayed at the display section 12C to report the content of the error to the user.

Then, the procedure proceeds to step SP16, and the central processing unit 22 drives the speaker 26 to emit the same alarm sound as in step SP6. Then, the procedure returns to step SP2. The central processing unit 22 again blinks the blue light-emitting diodes LB, and displays a predetermined message to prompt the user to place an IC card.

Figure 8:
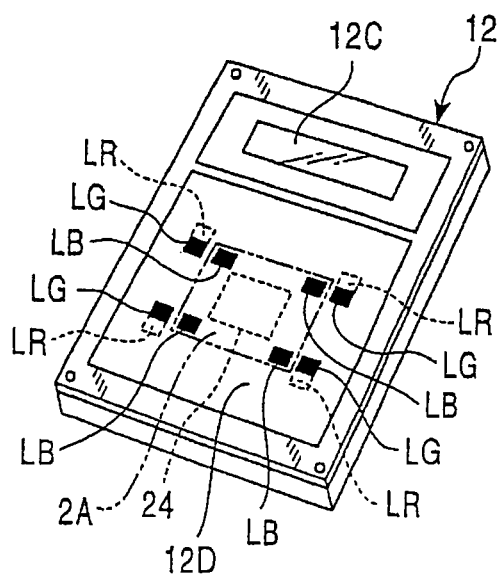
FIG. 8 is a perspective view of the input and output section shown in FIG. 5, in which processing has been correctly finished.

In contrast, when an affirmative result is obtained in step SP14, the procedure proceeds to step SP17. The central processing unit 22 turns on the green light-emitting diodes LG for a predetermined time in addition to the blue light-emitting diodes LB, as shown in FIG. 8. With this operation, the central processing unit 22 reports a normal processing completion to the user. At the same time, the central processing unit 22 displays an electronic-money balance at the display section 12C. When the balance is too little to cover payment in this process, the required additional amount of money is also displayed.

The procedure proceeds to step SP18, and the central processing unit 22 drives the speaker 26 to report a normal processing completion to the user. Then, the procedure proceeds to step SP19, and the processing is terminated. When a series of processing is finished in this way to correctly complete electronic-money payment processing, the central processing unit 22 reports it to the body apparatus 11. When the electronic-money payment processing has been finished correctly but an additional amount of money is required, the central processing unit 22 also reports the additional amount of money to the body apparatus 11. If an error occurs a predetermined number of times or more, the central processing unit 22 reports the condition to the body apparatus 11, and terminates the processing.

With the above operations, placement of an IC card and its position are indicated to the user by blinking of light-emitting diodes, and a correct processing completion or an error is reported in the store terminal 4.

With the above operations, in the input and output section 12, the loop antenna 24 is disposed at a predetermined position and serves as electromagnetic-wave emitting means for emitting an electromagnetic wave, whereas the transmitting and receiving circuit 23, the signal processing circuit 25, and the central processing unit 22 form data communication means for transmitting and receiving data to and from an IC card through the electromagnetic-wave emitting means. The light-emitting diodes form a display having a display area to which a predetermined area which includes at least a part of a portion where the electromagnetic-wave emitting means is disposed is set together with the plate disposed at the front surface side. The central processing unit 22 serves as control means for controlling the operations of the data communication means and the display, and switches the presentation of the display according to processing performed by the data communication means.

Figure 9:
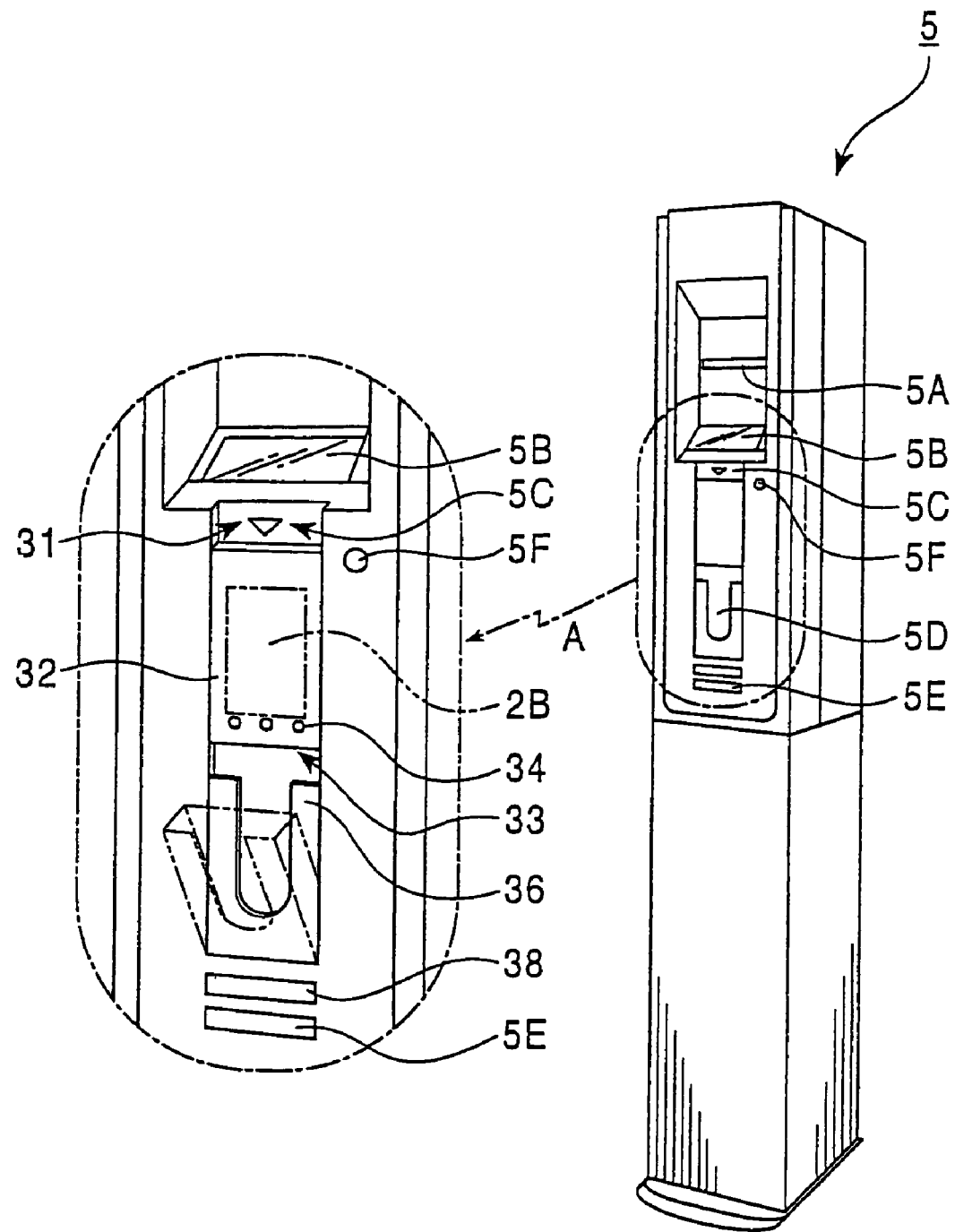
FIG. 9 is a perspective view showing a deposit machine in the IC card system shown in FIG. 2.

FIG. 9 is a perspective view of the deposit machine 5. The deposit machine 5 is formed in a narrow box shape, and has various operation sections at an upper half of the front surface. More specifically, the deposit machine 5 has an upper-half portion partially formed back, at the front. At this setback portion, an insertion opening 5A where a bill is inserted is formed. The deposit machine 5 increases the amount of electronic money by the amount of a bill inserted into the insertion opening 5A.

In the deposit machine 5, a display section 5B is formed at an angle under the insertion opening 5A to report various messages to the user through displays on the display section 5B. Under the display section 5B, an input opening 5C for the IC card 2B is formed, and a take-out opening 5D for the IC card 2B is further formed apart by a predetermined distance under the input opening 5C in the deposit machine 5. A pushbutton 5F for instructing a processing completion is disposed at a side of the input opening 5C, and an output opening 5E for a receipt which records electronic-money processing is disposed under the take-out opening 5D.

As shown in a partially extended manner and indicated by a symbol "A," a trough 31 having a width slightly larger than the short side of an IC card is formed in the vertical direction at a front panel in the deposit machine 5. A transparent-plate or acrylic cover 32 is disposed so as to partially cover up the trough 31 from a portion lower than the upper end of the trough by a predetermined distance in the deposit machine 5. In the deposit machine 5, the thickness of the cover 32 is specified such that the cover 32 is opposite the far side of the trough 31 with a predetermined gap being provided, and thereby, a path 33 for an IC card, having a rectangular-cross-sectional shape which allows an IC card to fall freely is formed. The upper-side opening of the path 33 is used as the input opening 5C for an IC card, and a triangle is indicated at the panel side, which shows the input opening 5C for an IC card.

A plurality of protrusions 34 protruding from the far side of the trough 31 is disposed at the path 33 for an IC card. When the IC card 2B is input to the input opening 5C, free fall of the IC card 2B is stopped by the protrusions 34, and the IC card 2B is held in the path 33 so that the user cannot take out the IC card 2B. Since the trough 31 is covered by the transparent cover 32 to form the path 33 in the deposit machine 5, the user can visually confirm that the IC card 2B is temporarily held in the path 33. The protrusions 34 are structured so as to be drawn back by control of a central processing unit described later. Therefore, when processing is finished, the deposit machine 5 draws back the protrusions 34 to allow the IC card 2B to fall.

In the deposit machine 5, a receiving pan 36 for receiving the dropped IC card 2B is disposed under the path 33. The receiving pan 36 is formed by injection-molding a transparent resin in a box shape such that the IC card 2B dropping through the path 33 can be completely accommodated and it can be seen from the outside. The receiving pan 36 is structured so as to swivel round a swivel shaft formed at its bottom, and therefore, the IC card 2B can be taken out after the receiving pan 36 is swiveled, as shown by a one-dot chain line. In the present embodiment, the receiving pan 36 serves as the take-out opening 5D.

The receiving pan 36 has a large cut extending from its upper end to the center on the front surface side. The user can easily swivel the receiving pan 36 toward the user by placing a finger at the cut, and take out the IC card 2B.

In the deposit machine 5, the IC card 2B is moved in this way. A loop antenna is disposed at a portion near the rear surface of the IC card 2B held by the protrusions 34 in the path 33, and thereby, the loop antenna can be driven to access the IC card temporarily held in the path 33. The IC card 2B is replenished with electronic money in the deposit machine 5 when the IC card 2B input from the input opening 5C is temporarily held in the path 33.

At a portion where the IC card 2B is temporarily held in this way in the deposit machine 5, red, blue, and green light-emitting diodes are disposed around the loop antenna in the same layout as described for the placement section 12D, with the loop antenna placed at the center; a semi-transparent plate is further disposed; and a display section functioning by lighting of the light-emitting diodes in the same way as in the store terminal 4 is formed at the far side of the trough 31 in the portion where the IC card 2B is temporarily held. The deposit machine 5 prompts the user to set an IC card, and further reports to the user a result of various processing by displays on the display section.

The deposit machine 5 is structured such that the path 33 serves as convey means for conveying an IC card serving as a data storage device by free fall in a way in which it can been seen, and the light-emitting diodes disposed at the trough 31 in the path 33 serve as a display having a display area in the path 33. In addition, the loop antenna disposed together with the light-emitting diodes serves as data communication means for transmitting and receiving data to and from an IC card held in the vicinity of the display area of the display and for performing various types of signal processing described later.

In the deposit machine 5, a display section 38 having green light-emitting diodes is disposed above the output opening 5E for a receipt. Lighting of the display section 38 can draw attention of the user to the output opening 5E for a receipt. In addition, the button 5F is structured such that a green light is turned on. Lighting of the button 5F can also draw attention of the user to the button 5F. The path 33 is also provided with an optical sensor for detecting a card or the like.

Figure 10:
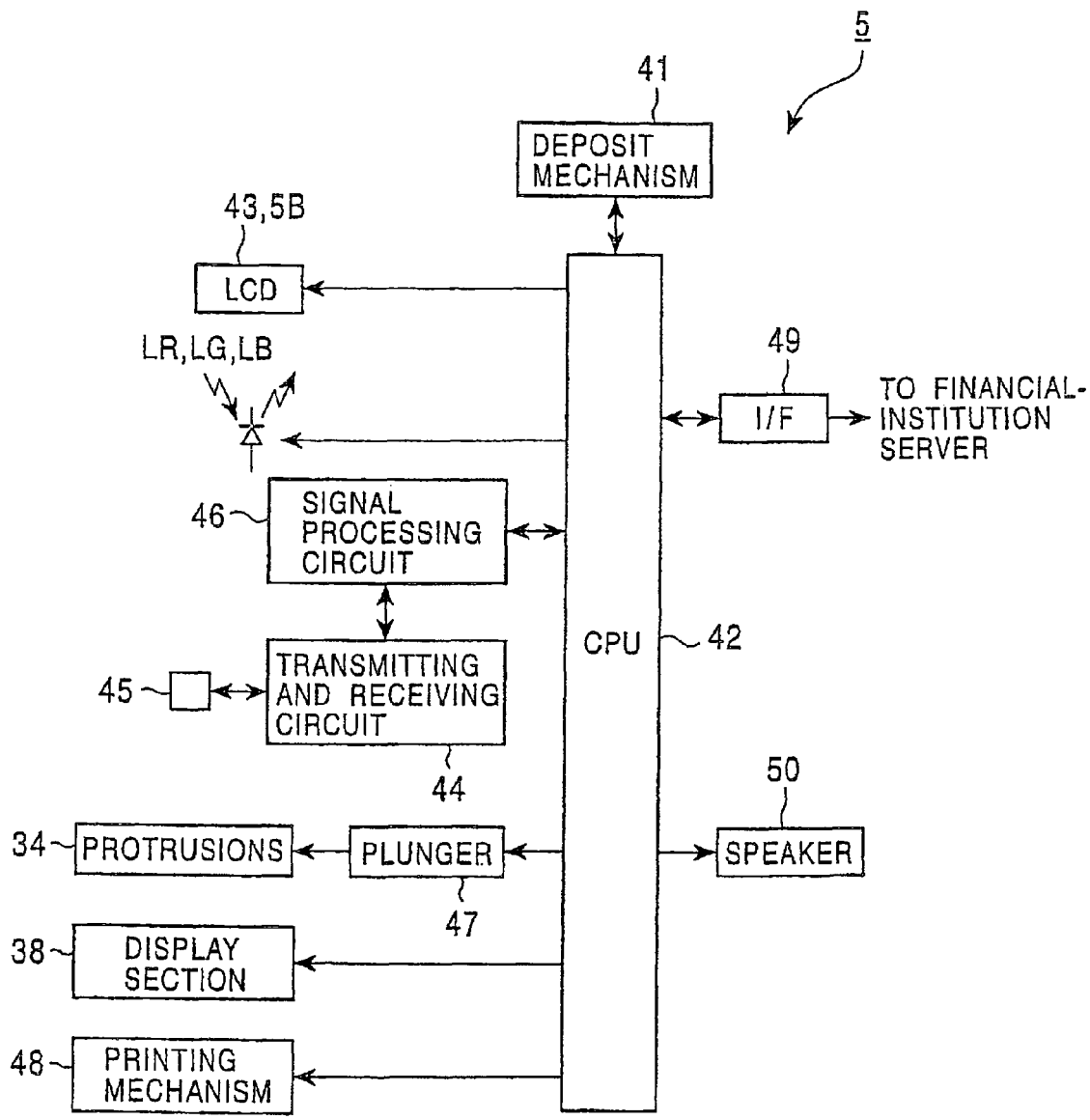
FIG. 10 is a block diagram showing the deposit machine shown in FIG. 9.

FIG. 10 is a block diagram showing the structure of the deposit machine 5. In the deposit machine 5, a deposit mechanism 41 detects the amount of money of bills inserted into the insertion opening 5A and reports it to a central processing unit 42. More specifically, the deposit mechanism 41 optically detects the insertion of bills into the insertion opening 5A, and draws the bills into the inside. A predetermined convey mechanism conveys the bills to a holding section, and the holding section holds them. During the conveyance, the amount of money of the bills is detected.

A liquid-crystal display panel (LCD) 43 forms the display section 5B, and displays various messages under the control of the central processing unit 42.

Light-emitting diodes LB, LG, and LR are light-emitting diodes disposed in the path 33 described above, and emit light at predetermined timing under the control of the central processing unit 42.

A transmitting and receiving circuit 44 drives a loop antenna 45 disposed in the path 33 by a predetermined high-frequency signal under the control of the central processing unit 42, and thereby, turns on the power of the IC card 2B held in the path 33. In addition, the high-frequency signal is modulated by data output from a signal processing circuit 46, and thereby, various commands and data are sent to the IC card 2B. Modulation performed by the output data is stopped at predetermined timing, and a high-frequency signal is detected to receive various types of data and others sent from the IC card 2B and they are output to the signal processing circuit 46.

The signal processing circuit 46 applies encoding processing and encryption processing to commands and various types of data and sends them to the transmitting and receiving circuit 44 under the control of the central processing unit 42. Conversely, the signal processing circuit 46 also releases the encryption of data obtained from the transmitting and receiving circuit 44, applies decoding processing, and reports a result of processing to the central processing unit 42.

A plunger 47 is a mechanism for moving the protrusions 34, and draws the protrusions 34 back from the path 33 under the control of the central processing unit 42 to drop the IC card 2B held in the path 33 to the receiving pan 36.

A printing mechanism 48 prints a receipt and discharges it from the output opening 5E under the control of the central processing unit 42. An interface (I/F) 49 is an interface with the financial-institution server 3, and reports processing performed by the deposit machine 5 to the financial-institution server 3 through a predetermined line.

Figure 11:
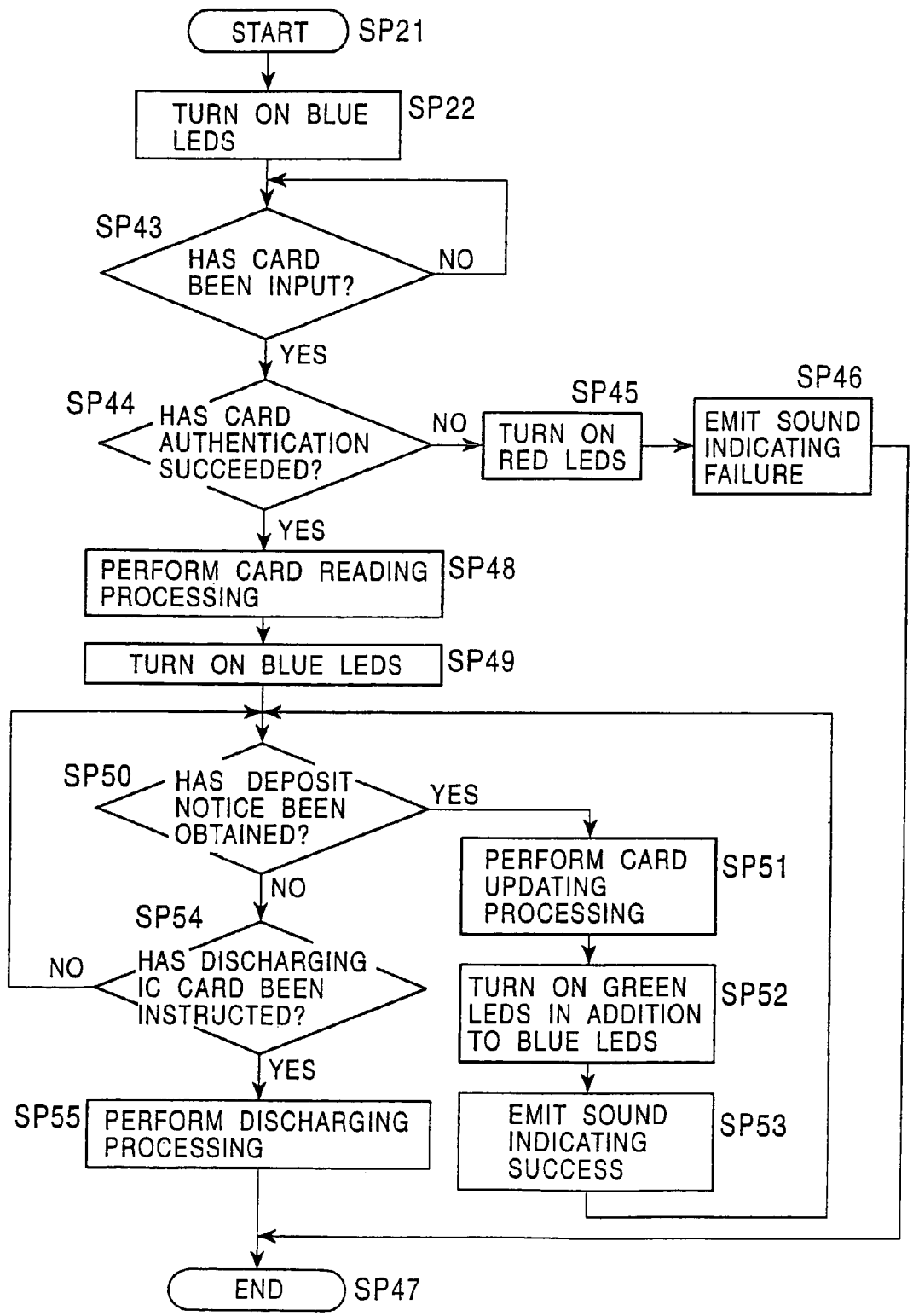
FIG. 11 is a flowchart showing the processing procedure of a central processing unit in the deposit machine shown in FIG. 10.

The central processing unit 42 is a controller for controlling the operation of the deposit machine 5; obtains a work area in a memory not shown, and executes a predetermined processing procedure to deposit electronic money in the IC card 2B. In the processing, the central processing unit 42 executes the processing procedure shown in FIG. 11 to switch a presentation at the path 33 according to the processing to prompt the user to perform various operations and report an error with the same presentations as those used by the input and output section 12.

More specifically, when it is determined from a result of detection performed by a sensor not shown that the user stops in front of the deposit machine 5, the central processing unit 42 starts the processing procedure, and the procedure proceeds from step SP21 to step SP22. The central processing unit 42 instructs the blue light-emitting diodes LB to blink among the light-emitting diodes of various colors, disposed in the path 33 to prompt the user to insert an IC card into the insertion opening 5C. The central processing unit 42 holds the protrusions 34 at a state in which they protrude into the path 33. When an IC card is input to the insertion opening 5C, the IC card is temporarily held thereby in the path 33. In addition to blinking of the blue light-emitting diodes LB, the central processing unit 42 drives the liquid-crystal display panel 43 to indicate on the display section 5B messages such as "Welcome" and "Set card".

Then, the procedure proceeds to step SP43, and the central processing unit 42 determines from a result of detection performed by the optical sensor disposed in the path whether a card or the like has been inserted. When a card or the like has been inserted, the procedure proceeds to step SP44; and the central processing unit 42 starts the operation of the transmitting and receiving circuit 23, controls the operation of the signal processing circuit 25 so as to send a polling command to the IC card 2A, and detects a response corresponding to the polling command. When a correct response is obtained, mutual authentication processing is executed for the IC card, and it is determined whether correct mutual authentication has been finished. With the above operations, the central processing unit 42 determines whether an IC card has been correctly inserted from the insertion opening 5C.

When a bank cash card, for example, or the like which is other than an IC card is inserted, the central processing unit 42 obtains a negative result in step SP44, and the procedure proceeds to step SP45. The central processing unit 42 stops turning on the blue light-emitting diodes LB, and turns on the red light-emitting diodes LB for a predetermined time. The central processing unit 42 also controls the operation of the plunger 47 so as to retract the protrusions 34 from the path 33 to drop a card-shaped object temporarily held in the path 33 to the receiving pan 36. In addition, the liquid-crystal display panel 43 is driven to display a message "This card cannot be used" on the display section 5B. The central processing unit 42 reports an error and the content of the error to the user by lighting of the red light-emitting diodes LR and a presentation on the display section 5B.

In the next step SP46, the central processing unit 42 drives a speaker 50 to emit a predetermined alarm sound. The procedure proceeds to step SP47, and the processing procedure is finished. With these operations, the central processing unit 42 illuminates the path 33 by blinking of the blue light-emitting diodes LB disposed at a far side of the path 33 to wait for the IC card 2B to be inserted, as shown in FIG. 12A. If a cash card or the like is erroneously inserted, the card or the like is discharged to the receiving pan 36, and the red light-emitting diodes LR are turned on instead of blinking of the blue light-emitting diodes LB, as shown in FIG. 12B.

In contrast, when the IC card 2B is inserted and mutual authentication is performed correctly, the central processing unit 42 obtains an affirmative result in step SP44, and the procedure proceeds to step SP48. The central processing unit 42 reads the remaining amount of electronic money and others from the IC card 2B under the control of the signal processing circuit 46. In the next step SP49, the blinking blue light-emitting diodes LB are turned on. The central processing unit 42 further turns on the light of the pushbutton 5F to report to the user that the pushbutton 5F can be operated. In addition, the central processing unit 42 drives the liquid-crystal display panel 43 to display a message "Continuous deposit allowed" together with the remaining amount of electronic money for a predetermined time on the display section 5B, and then to display a message "Press pushbutton to terminate" to show the reason why the light of the pushbutton 5F has been turned on.

Then, the procedure proceeds to step SP50, and the central processing unit 42 determines whether a deposit notice has been obtained from the deposit mechanism 41 to determine whether the user has input a bill. When a negative result is obtained, the procedure proceeds to step SP54, and the central processing unit determines whether the user has pressed the pushbutton 5F to instruct the discharge of the IC card. When a negative result is obtained, the procedure returns to step SP50.

When the IC card 2B is inserted correctly, the central processing unit 42 temporarily holds the IC card 2B in the path 33 and illuminates it from the rear side by the blue light-emitting diodes LB to wait for a user operation, as shown in FIG. 13A. When the user inputs a bill into the deposit mechanism 41 while the IC card 2B is held as described above, since a positive result is obtained in step SP50, the central processing unit 42 switches the presentation of the display section 5B to a presentation of the amount of input money, and the procedure proceeds to step SP51. The central processing unit 42 instructs the IC card 2B to update its electronic money such that the electronic money is increased by the amount of input money reported from the deposit mechanism 41. The central processing unit 42 also displays a message "Being deposited" in the display section 5B.

When the IC card 2B reports the completion of updating the amount of money, the procedure proceeds to step SP52, and the green light-emitting diodes LG are turned on for a predetermined time in addition to the blue light-emitting diodes LB to report the completion of deposit to the user. In the next step SP53, the speaker 50 is driven to emit a predetermined sound to report the completion of deposit to the user. The central processing unit 42 drives the liquid-crystal display panel 43 to display a message "Continuous deposit allowed" for a predetermined time together with the amount of electronic money recorded in the IC card, and then switches the presentation to a message "Press Pushbutton to terminate." The central processing unit 42 increases the electronic money by the amount of input money in this way, and the procedure returns to step SP50.

When the IC card 2B is inserted correctly, the central processing unit 42 holds the IC card 2B in the path 33 and illuminates it from the rear side by the blue light-emitting diodes LB, as shown in FIG. 13A. When the user inputs a bill, the central processing unit 42 increases the electronic money by the amount of input money. When this increasing is finished, the IC card 2B is illuminated by the blue light-emitting diodes LB and the green light-emitting diodes LG, as shown in FIG. 13B. Since the procedure returns to step SP50, the central processing unit 42 executes this series of processing procedure while the IC card 2B is being held in the path, every time the user inputs a bill.

In contrast, when the user presses the pushbutton 5F, since the central processing unit 42 obtains an affirmative result in step SP54, the procedure proceeds to step SP55. The central processing unit 42 drives the plunger 47 to retract the protrusions 34 from the path 33 to drop the IC card 2B held in the path 33 to the receiving pan 36. The central processing unit 42 also displays a message "Processing finished. Take out card" in the display section 5B.

The central processing unit 42 is structured such that the operation of the receiving pan 36 can be detected by a predetermined sensor. When the user manipulates the receiving pan 36 to take out the IC card 2B, a message "Operate button to print receipt" is displayed in the display section 5B. When this message is displayed for a predetermined time, the central processing unit 42 then displays a message "Thank you". The procedure proceeds to step SP47, and the processing procedure is finished. In contrast, when the pushbutton 5F is operated during the predetermined time, the printing mechanism 48 is driven to print the amount of input electronic money, the remaining amount of electronic money after deposit, and others. Then, the processing proceeds to step SP47, and the processing procedure is finished.

(1-2) Operation in the First Embodiment

With the above structure, in the IC card system 1 (FIG. 2), the IC card 2A in which electronic money has been recorded is accessed at the store terminal 4 disposed at a store to execute electronic-money payment processing; electronic money in the IC card 2B reduced by the electronic-money payment is increased at the deposit machine 5; and thereby, the IC card 2A is used as an electronic-money recording medium for various payment.

When electronic money is used in this way, a clerk operates the body apparatus 11 to calculate the amount of money to be paid, and the body apparatus 11 instructs the input and output section 12 to perform payment processing with this amount of money to be paid, in the payment processing at the store terminal 4 (FIG. 3 and FIG. 4). In the IC card system 1, the loop antenna 24 disposed at the placement section 12D starts sending a polling command serving as a call to the IC card 2A in response to the instruction. The blue light-emitting diodes LB disposed at the placement section 12D blink (FIG. 1, FIG. 5, and FIG. 6). With this operation, portions corresponding to the four corners of the IC card 2A conspicuously blink in blue in the placement section 12D to prompt the user to place the IC card 2A on the placement section 12D. A message prompting an operation and the amount of money to be paid are displayed in the display section 12C formed of the liquid-crystal display panel.

When a polling command is sent in this way; a response from the IC card is obtained; and correct mutual authentication processing is performed so that electronic money in the IC card 2A is reduced by the amount of money to be paid. As the series of processing advances, blinking of the blue light-emitting diodes LB is changed to continuous lighting of the blue light-emitting diodes LB, and then to a presentation by the blue light-emitting diodes LB and the green light-emitting diodes LG (FIG. 8), and a predetermined sound is output. When the series of processing cannot be performed correctly, a presentation by the blue light-emitting diodes LB is changed to that by the red light-emitting diodes LR, and sound indicating an error is emitted.

Such IC-card processing is executed when an IC card is held in a proximity of the placement section 12D. Since the light-emitting diodes and the loop antenna 24 are disposed and covered with semi-transparent and transparent plates to form the placement section 12D, the placement section 12D also functions as a display section with a feature of an IC card, that is, non-contact accessibility, being used. In other words, in this portion, various light-emitting diodes which make the placement section 12D serve as a display area form a display section, and in the input and output section 12, the loop antenna forms data communication means for transmitting and receiving data to and from an IC card held in proximity to the display area. By processing in the central processing unit 22, a presentation at the display section is switched according to data communication processing.

In the input and output section 12, since the loop antenna 24 is disposed almost at the center of the display area which is at the center of the various types of light-emitting diodes, when an IC card is brought toward the center of various indications of light-emitting diodes, data exchange is possible with the IC card. In a state in which the IC card is held in this way, a presentation can be switched to report the completion of processing or an error to even a user unfamiliar with the operation of an IC card.

In other words, in the input and output section 12, when an IC card is brought toward an area enclosed by the blue light-emitting diodes which are blinking; a response is obtained from the IC card, mutual authentication is completed, the contents of the IC card are read correctly, and blinking of the blue light-emitting diodes LB is switched to continuous lighting thereof. Therefore, a presentation at the placement section 12D, which also functions as the display section, can be provided for the user as an operation guide of the IC card 2A.

When payment is finished with electronic money, the green light-emitting diodes are turned on for a predetermined period. The start of this indication of the green light-emitting diodes or the end of the indication can report to the user the completion of processing.

In contrast, when correct processing cannot be performed, the red light-emitting diodes are turned on for a predetermined period. The start of this indication or the end thereof can report to the user an error.

Together with these indications, a predetermined sound is output from the speaker 26 or a message is displayed on the display section 12C to report the series of processing to the user. Especially when a display made from the light-emitting diodes is formed at a portion having a relatively large area in the input and output section 12, the user naturally pays attention to the display made from the light-emitting diodes. Therefore, when the display section 12C is formed in a proximity of the display made from the light-emitting diodes and a detailed message is shown there, a user's attention can be drawn not only to a sensuous operation guide made by lighting of light-emitting diodes but also to a detailed guide made by messages displayed on the display section 12C. Therefore, a simple and positive user interface is obtained with a feature of non-contact-type IC cards being effectively used.

When the placement section 12D is also used as a display section in this way and a presentation at the display section guides for IC-card operations, a dented section or the like for guiding an IC card does not need to be made in the placement section. Therefore, a plane, transparent acrylic plate covers the entire input and output section 12, including the display section 12C formed of the liquid-crystal panel. Consequently, the input and output section 12 has a good design, and dust and the like are effectively prevented from accumulating on the surface thereof.

Since the user can manipulate an IC card by a hand in the input and output section 12 without passing the IC card to a clerk, safety is improved largely compared with a conventional case.

On the other hand, in the deposit machine 5 (FIG. 9), after an IC card is input to the input opening 5C serving as an opening through which an IC card is vertically dropped, when a bill is inserted into the insertion opening 5A, electronic money is increased in the IC card by the amount of money of the input bill, and the IC card is discharged by operating the button 5F.

In this processing, when an IC card is input to the input opening 5C in the deposit machine 5, the IC card is dropped freely and temporarily held in the path 33, and a process for increasing electronic money is executed in this state. The deposit machine 5 is structured such that the user can see the inside of the path 33 extending from the input opening 5C for an IC card to the receiving pan 36 from which the IC card is taken out. When the user stops in front of the deposit machine 5, the portion where an IC card is temporarily held is indicated (FIG. 12A) by blinking of the blue light-emitting diodes in the path 33 structured in this way, and a predetermined message is indicated at the display section 5B to prompt the user to input an IC card.

When an IC card is input; the IC card is temporarily held in the path 33, mutual authentication is performed correctly, the contents of the IC card are read, and blinking of the blue light-emitting diodes is switched to continuous lighting thereof to illuminate the IC card temporarily held in the path 33 from the rear in blue. When electronic money is processed correctly, the green light-emitting diodes are turned on for a predetermined time in addition to continuous lighting of the blue light-emitting diodes to illuminate the IC card which was so far illuminated in blue, with greenish illumination.

When the processing is finished, if the button 5F is operated, the protrusions 34 serving as a stopper for temporarily holding the IC card in the path 33 are retracted to drop the IC card freely to the receiving pan 36 for discharging.

In contrast, when a credit card or the like is erroneously input, or when an IC card of a different type is input, the input object is detected by a sensor, and then the protrusions 34 serving as a stopper are retracted to immediately drop the input object freely to the receiving pan 36 for discharging because it cannot be processed correctly. In this case, blinking of the blue light-emitting diodes is switched to lighting of the red light-emitting diodes for a predetermined time to positively report an error to the user in the deposit machine 5.

Also in the deposit machine 5, a display having a predetermined display area is formed at a portion where an IC card is temporarily held, at a rear side of the path 33, and data communication means for transmitting and receiving data to and from an IC card temporarily held in the path 33 is formed in a proximity of the display area. Under the control of the central processing unit 42 serving as control means, a presentation of the presentation is switched according to processing performed by the data communication means. With such processing, a user interface effectively using a feature of a data storage device, non-contact accessibility, is provided.

A presentation is switched in this way between when electronic money is correctly increased and when an error occurs, and a predetermined sound is output from the speaker 50 according to switching of the presentation. A corresponding message is also indicated in the display section 5B. With these methods, an error and other states are positively reported to the user and operations are guided.

(1-3) Advantages of the First Embodiment

According to the above-described structure, a presentation at a predetermined area which includes a portion where a loop antenna used for data communication with an IC card serving as a data storage device is disposed is switched according to data communication processing with the data storage device to provide a user interface with a feature of the data storage device, non-contact accessibility, effectively being used. In other words, the user can visually understand various determination rules, such as at what timing the user is asked to set an IC card and at what timing the user is asked to take out the IC card, at a portion where the IC card is held, according to switching of the presentation. Ease-of-use is improved compared with a conventional case.

More specifically, the loop antenna used for data communication with an IC card is disposed almost at the center of the display area for this presentation, and data exchange is performed. Therefore, the presentation guides the user for operations, and it reports the user various processing states.

More specifically, when a presentation of the display is switched between a period from when a polling is sent to an IC card to when a response is obtained, and a period when data is transmitted and received according to the response, a presentation prompting an IC-card operation is provided until the response is obtained, and a presentation indicating to the user that the IC card is held is provided after the response.

When a presentation of the display is switched between when processing has been correctly finished and when processing cannot be finished correctly, the completion of correct processing and an error are reported.

If predetermined alarm-sound emitting means is driven to emit a predetermined sound when such a display shows a presentation, various processing results are more positively reported to the user.

In the deposit machine 5, when convey means for conveying an IC card with free fall in a manner in which the card can be seen is structured, and a presentation at a predetermined area which includes a portion where the loop antenna used for data communication with the IC card is disposed is switched according to data communication processing with the IC card in the convey means, a user interface effectively using a feature of a data storage device, non-contact accessibility, is provided also in the deposit machine.

When electronic money cannot be correctly processed in the convey means, or when a different object is input, an operation is switched to discharge the input object when a presentation at the display is switched, so that even a user unfamiliar with operations can positively operate the deposit machine.

An IC card is conveyed in a manner in which the IC card can be seen, and the IC card is received from a user's hand and positively processed, so that the user has an improved sense of safety.

When an IC card is conveyed by free fall, the entire structure is simplified.

(2) Other Embodiments

In the above-described embodiment, light-emitting diodes are disposed at portions corresponding to the four corners of an IC card to form a display. The present invention is not limited to this structure. Light-emitting diodes may be disposed at various positions to form a display. The present invention can be applied not only to a case in which light-emitting diodes form a display but also to a case in which a liquid-crystal panel or EL is used to form a display. When an image display such as a liquid-crystal panel is used to form a display, it is possible to display the shape of an IC card, a still image or a motion image prompting the user to operate an IC card, and a message as well as to show portions indicating a display position by lighting. In this case, it is also possible that a part or the whole of an IC card is made from a transparent material to make a presentation of the display visible through the transparent portion.

In the above-described embodiment, a semi-transparent plate and a transparent plate are laminated on light-emitting diodes to form a display as if the semi-transparent plate served as a light-emitting plane. The present invention is not limited to this structure. Even if such a plate is not disposed, the same advantage is obtained. In this case, a portion enclosed by a plurality of light-emitting diodes serves as a display area made from such light-emitting diodes.

In the above-described embodiment, a loop antenna is disposed below a semi-transparent member and a transparent member which are surface members. The present invention is not limited to this structure. The structure may be made, for example, such that a transparent electrode is used for form a loop antenna on a transparent member, and the transparent member is disposed at the front surface of each of various displays to dispose the loop antenna at the front-surface side. In this case, when a liquid-crystal display panel or an EL is used to form a display, a loop antenna is easily disposed.

In the above-described embodiment, display switching and sound emission guide user operations, and further report errors and other conditions. The present invention is not limited to this case. Only display switching or only sound emission may be used as necessary to make a report. Since these type of data storage devices have a feature of non-contact accessibility, processing can be executed without passing the media to a clerk. When only sound emission guides operations or reports an error and other conditions, even when the user performs a series of processing by oneself, the user can understand a progress situation of the processing.

In the above-described embodiment, the present invention is applied to the input and output sections of a deposit machine and a store terminal. The present invention is not limited to this application. It can be widely applied to various processing apparatuses for IC cards.

In the above-described embodiment, the present invention is applied to a processing apparatus for a data storage device, such as an IC card. The present invention is not limited to this application. It can be widely applied to processing apparatuses for data holding apparatuses, such as mobile terminals (portable telephones, portable information terminals, and the like) having an IC-card function. In the present specification, a data storage device and a data holding apparatus have the same meaning.

In the above-described embodiment, a data storage device is accessed in a non-contact manner by an electromagnetic wave emitted when a loop antenna is driven. The present invention is not limited to this case. It can be widely applied to a case in which a data storage device is accessed in a non-contact manner by light, which is an electromagnetic wave having a short wavelength.

What is claimed is:

1. An information processing apparatus for performing data communication with a data storage device in a non-contact manner, comprising:
   data communication means for transmitting and receiving data to and from the data storage device by an electromagnetic wave, said data communication means including an electromagnetic wave emitting means disposed at a predetermined position for emitting said electromagnetic wave;
   a signal processing means, for applying encryption and encoding to data transmitted by the data communication means and decryption to data received by the data communication means;
   a display means for displaying a placement section including a means for indicating where the data storage device is to be placed, the electromagnetic wave emitting means being in proximity to the display means;
   control means for controlling the operations of the data communication means, the signal processing means, the means for indicating, and the display means, wherein the control means activates the display means when a polling command is issued by the signal processing means and switches a presentation of the display means; and
   an output means for outputting predetermined sounds indicating success or error regarding the data communication with the data storage device,
   wherein the means for indicating includes a set of light-emitting diodes that the control means turns on for a predetermined time based on a polling state.

2. An information processing apparatus according to claim 1, wherein the electromagnetic wave emitting means is disposed approximately at the center of the placement section.

3. An information processing apparatus according to claim 1, wherein the data communication means starts transmitting and receiving predetermined data to and from the data storage device when a response corresponding to the polling command issued to the data storage device is obtained; and
   the control means switches the presentation of the display means at least between a period of time from when the polling command is issued to the data storage device to when the response is obtained, and a period of time in which the data is transmitted and received according to the response.

4. An information processing apparatus according to claim 3, wherein the display means for showing the position where the data storage device should be held until the response is obtained from the data storage device.

5. An information processing apparatus according to claim 1, wherein the control means switches the presentation of the display means during transmitting and receiving the data between when the processing has been successfully finished and when the processing cannot be successfully finished.

6. An information processing apparatus according to claim 1, wherein the control means drives the output means to emit a predetermined sound in coordination with a predetermined presentation displayed on the display means.

7. An information processing apparatus according to claim 1, wherein the data storage device is a non-contact-type IC card.

8. An information processing apparatus according to claim 1, wherein transmitting and receiving the data is transmitting and receiving electronic money recorded in the data storage device.

9. An information processing apparatus according to claim 1, wherein the control means controls the means for indicating to induce a user to keep the data storage device placed in the non-contact manner over the placement section by operating the set of light-emitting diodes.

10. An information processing apparatus for performing data non-contact communication with a data storage device, comprising:
a transmitting and receiving means for communicating data to and from the data storage device by an electromagnetic wave;
a display means for displaying a placement section including a means for indicating where the data storage device is to be placed;
an electromagnetic wave emitting means coupled to the transmitting and receiving means, where the electromagnetic wave emitting means being in proximity to the display means and where the electromagnetic wave means for detecting a presence of the data storage device;
a signal processing means, for applying encryption and encoding to data transmitted by the transmitting and receiving means and decryption to data received by the transmitting and receiving means;
a control means for controlling the operations of the transmitting and receiving means, the electromagnetic wave emitting means, the display means, the signal processing means, the means for indicating, and an output means, wherein the control means issues polling commands to the data storage device through the signal processing means when the electromagnetic wave means detects the presence of the data storage device while switching a presentation of the display means; and
the output means for outputting predetermined sounds relating to the presentation of the display means,
wherein the means for indicating includes a set of light-emitting diodes that the control means turns on for a predetermined time based on a polling state.

11. An information processing apparatus according to claim 10, wherein the control means controls the means for indicating to induce a user to keep the data storage device placed in the non-contact manner over the placement section by operating the set of light-emitting diodes.

12. An information processing apparatus for performing data communication with a data storage device in a non-contact manner, comprising:
a transmitting and receiving circuit for transmitting and receiving data to and from the data storage device by an electromagnetic wave, said transmitting and receiving circuit including an electromagnetic wave emitter disposed at a predetermined position for emitting said electromagnetic wave;
a signal processor, for applying encryption and encoding to data transmitted though the transmitting and receiving circuit and decryption to data received through the transmitting and receiving circuit;
a display for displaying a placement section including a set of indicators where the data storage device is to be placed, the electromagnetic wave emitter being in proximity to the display;
a controller for controlling the operations of the transmitting and receiving circuit, the signal processor, the set of indicators, and the display, wherein the controller activates the display when a polling command is issued by the signal processor and switches a presentation of the display; and
an output for outputting predetermined sounds indicating success or error regarding the data communication with the data storage device,
wherein the set of indicators includes a set of light-emitting diodes that the controller turns on for a predetermined time based on a polling state.

13. An information processing apparatus according to claim 12, wherein the electromagnetic wave emitter is disposed approximately at the center of the placement section.

14. An information processing apparatus according to claim 12, wherein the transmitting and receiving circuit starts transmitting and receiving predetermined data to and from the data storage device when a response corresponding to the polling command issued to the data storage device is obtained; and
the controller switches the presentation of the display at least between a period of time from when the polling command is issued to the data storage device to when the response is obtained, and a period of time in which the data is transmitted and received according to the response.

15. An information processing apparatus according to claim 14, wherein the display for showing the position where the data storage device should be held until the response is obtained from the data storage device.

16. An information processing apparatus according to claim 12, wherein the controller switches the presentation of the display during transmitting and receiving the data between when the processing has been successfully finished and when the processing cannot be successfully finished.

17. An information processing apparatus according to claim 12, wherein the controller drives the output to emit a predetermined sound in coordination with a predetermined presentation displayed on the display.

18. An information processing apparatus according to claim 12, wherein the data storage device is a non-contact-type IC card.

19. An information processing apparatus according to claim 12, wherein transmitting and receiving the data is transmitting and receiving electronic money recorded in the data storage device.

20. An information processing apparatus according to claim 12, wherein the controller controls the set of indicators for indication to induce a user to keep the data storage device placed in the non-contact manner over the placement section by operating the set of light-emitting diodes.

* * * * *

UNITED STATES PATENT AND TRADEMARK OFFICE
CERTIFICATE OF CORRECTION

PATENT NO. : 8,406,367 B2  Page 1 of 1
APPLICATION NO. : 12/453151
DATED : March 26, 2013
INVENTOR(S) : Hiroyuki Oda et al.

It is certified that error appears in the above-identified patent and that said Letters Patent is hereby corrected as shown below:

Title Page, Item (75)

"Yakayuki Ohnishi" should read -- Takayuki Ohnishi --.

Signed and Sealed this
Third Day of September, 2013

Teresa Stanek Rea
*Acting Director of the United States Patent and Trademark Office*